Figure 1:
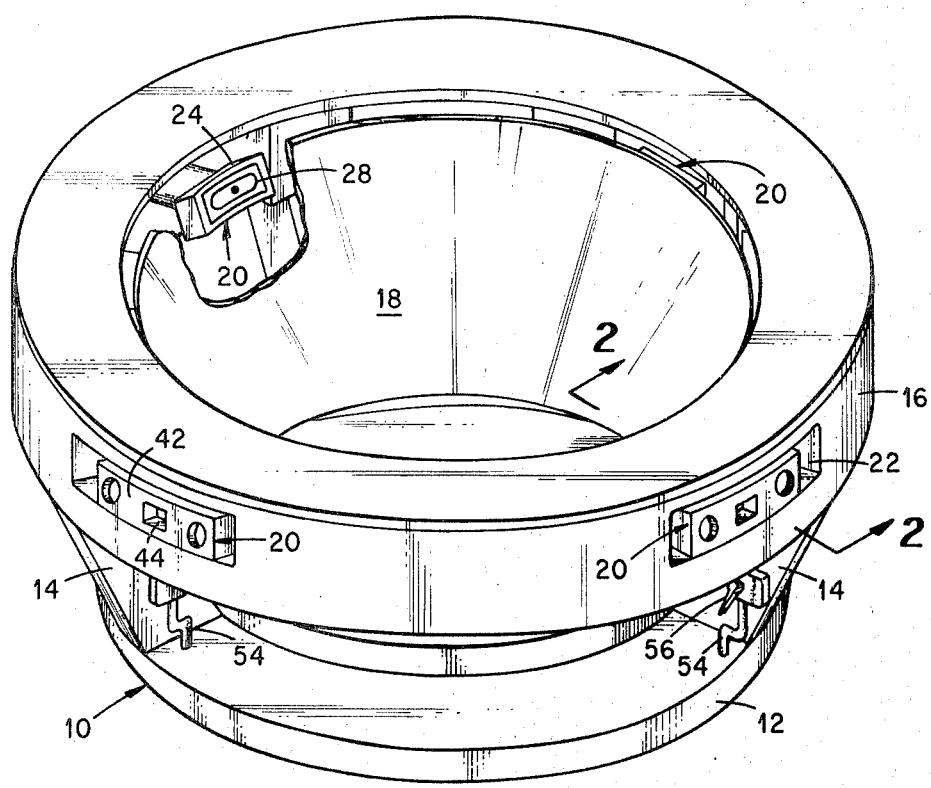

United States Patent [19]
Roberts et al.

[11] 3,838,865
[45] Oct. 1, 1974

[54] FIXTURE FOR SUPPORTING A WORKPIECE IN A MACHINE TOOL

[75] Inventors: Arthur O. Roberts, Oak Ridge; Grober C. Bell, Norris, both of Tenn.

[73] Assignee: The United States of America as represented by the United States Atomic Energy Commission, Washington, D.C.

[22] Filed: Aug. 24, 1973

[21] Appl. No.: 391,378

[52] U.S. Cl............................ 279/3, 269/21, 51/235
[51] Int. Cl..... B23b 31/10, B25b 11/00, B23q 3/00
[58] Field of Search............. 279/3; 269/21; 51/235; 90/DIG. 25

[56] References Cited
UNITED STATES PATENTS
1,616,188  2/1927  Hatcher............................ 269/21 X
2,729,040  1/1956  Wallace et al....................... 51/235

*Primary Examiner*—Francis S. Husar
*Attorney, Agent, or Firm*—John A. Horan; David S. Zachry; Earl L. Larcher

[57] ABSTRACT

This invention is directed to a fixture for supporting a thinwalled workpiece defined by a surface of revolution in a "free" state during a machining operation. The fixture utilizes a plurality of circumferentially spaced-apart vacuum heads for supporting the workpiece with each head being pivotally mounted and selectively radially adjustable for contacting the surface of the workpiece.

5 Claims, 2 Drawing Figures

PATENTED OCT 1 1974

3,838,865

FIXTURE FOR SUPPORTING A WORKPIECE IN A MACHINE TOOL

The present invention relates generally to a fixture for supporting a thin-walled workpiece in a working relationship to a machine tool, and more particularly to a vacuum chuck for holding such a workpiece with minimal distortion prior to and during machining. This invention was made in the course of, or under, a contract with the United States Atomic Energy Commission.

In machining thin-walled workpieces defined by cylinders, orbicular structures, cones, frustums, and other curvilinear surfaces, it is desirable to employ a machine fixture or chuck which is capable of supporting the workpiece in a nondeformed manner during machining while preventing distortion due to stresses induced by the tool. These characteristics of the chuck are especially desirable where wall thicknesses and roundness requirements of the workpiece must be held within close tolerance and where the workpiece is of such dimensions that it is distortable under its own weight.

Vacuum chucks as employed in the past included those which utilized a plurality of vacuum pads of configurations conforming to the curvature of the workpiece. The forming of these vacuum pads to configurations which sufficiently coincided with the contour of the workpiece so as not to effect distortion of the latter prior to and during machining operations proved to be a difficult problem. Further, many of these vacuum pads were spring-loaded so as to constantly bear against the workpiece which often induced stresses in the thin-walled parts or workpieces being machined. Additionally, the vacuum pads were controlled by a central vacuum source so as to operate together as one, which operation did not allow for the selective engagement or release of the vacuum pads for stress relief or truing of the workpiece configuration during various phases of the machining operation. Also, the use of the chucks having vacuum pads prepared to conform to a specific configuration limited the pads to that specific shape and size, thus necessarily requiring the utilization of a considerable number of vacuum pads of differing shape and size in the event several workpieces of different dimensions or shapes are to be machined or if one workpiece is to be subjected to several machining operations which vary the shape and/or size of the workpiece.

It is the aim of the present invention to obviate or substantially minimize the above and other problems or shortcomings suffered by the prior art vacuum chuck mechanisms by providing a universal vacuum fixture which can readily be used to support workpieces of the same shape in differing sizes or workpieces of different shapes and sizes in configurations as described above. This goal is achieved by using a vacuum fixture or vacuum chuck wherein a plurality of vacuum heads are disposed about the periphery of the workpiece with each vacuum head being selectively radially movable and swivelable so as to allow each vacuum head to engage the surface of the workpiece regardless of its configuration or diameter within a relatively large range in dimensions. The use of selectively movable vacuum heads is also advantageous for stress relief and workpiece placement or orientation during the machining operation. Another advantage of the present invention is derived by using individual vacuum controls for each vacuum head so as to provide for the selective engagement or disengagement of each vacuum head from the workpiece.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for the purpose of illustration and description. The preferred embodiment illustrated is not intended to be exhaustive or to limit the invention to the precise form disclosed. It is chosen and described in order to best explain the principles of the invention and their application in practical use to thereby enable others skilled in the art to best utilize the invention in various embodiments and modifications as are best adapted to the particular use contemplated.

Figure 2:
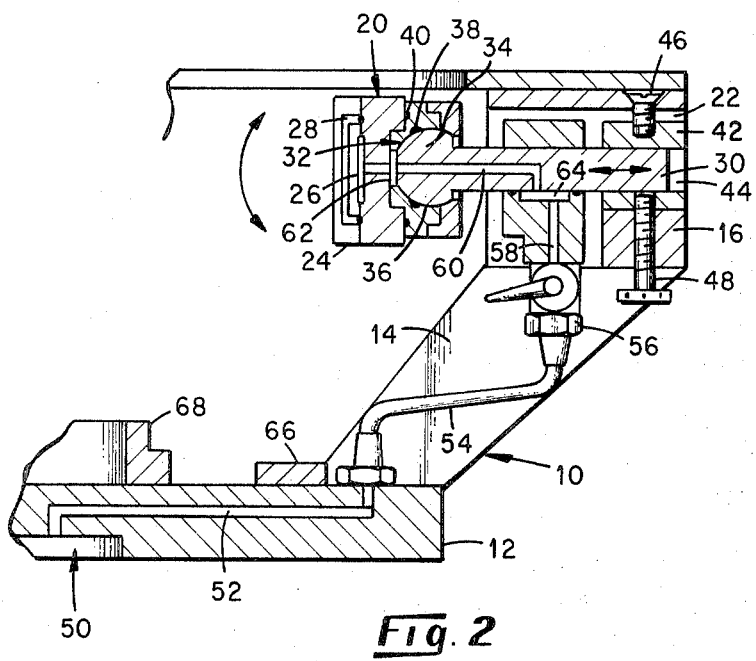

In the accompanying drawings:

FIG. 1 is a perspective view of the fixture of the present invention showing a thin-walled, cone-shaped workpiece disposed therein; and FIG. 2 is a fragmentary sectional view taken along line 2—2 of FIG. 1 showing details of a movable vacuum pad assembly with the workpiece omitted and the sectioned vacuum head rotated into a vertical orientation for purposes of description and illustration.

Described briefly, the fixture of the present invention is utilized for supporting a hollow, thin-walled workpiece defined by a curvilinear surface in a working relationship to a machine tool. The fixture comprises an annular frame having an axis of rotation, a plurality of vacuum heads circumferentially spaced apart about the inner surface of the frame, means coupled to each of the vacuum heads for providing radial displacement of each of the vacuum heads with respect to said axis for effecting contact of the vacuum heads with the outer surface of the workpiece, and swivel means at each of the vacuum heads for providing pivotal movement of the vacuum heads to effect the contact of the latter with the outer surface of the workpiece.

Described more specifically and with reference to the figures, the present invention is directed to a vacuum fixture for supporting thin-walled workpieces defined by a surface of revolution or curvilinear surfaces as described above. The fixture is shown comprising a frame 10 having a base 12 of a discoidal configuration which is adapted to be attached to face plate of a lathe or a rotary table of a milling machine.

The frame 10 is provided with a plurality of circumferentially spaced-apart ribs 14 which project orthogonally from the base 12 and are affixed to a ring or annulus 16 disposed in a plane parallel to the base so as to define a workpiece-receiving cavity in the frame.

In order to support the workpiece 18 (shown in the form of a hollow frustum) in the frame 10 a plurality of vacuum pad assemblies 20 are carried by the annulus 16 at circumferentially spaced-apart locations. As shown, the annulus 16 is provided with four rectangular-shaped passageways 22 which extend through the annulus along a plane parallel to the base 12 for receiving the vacuum pad assemblies 20. Each vacuum pad assembly 20 comprises a vacuum head 24 of a rectangular configuration having a workpiece-contacting face thereon curved to generally conform to the surface of the curvilinear part being machined. The face of the vacuum head is provided with a central opening 26 in registry with a vacuum source, as will be described below. This opening 26 is in turn encircled with an appropriate seal 28 which maintains a vacuum-tight fit with the surface of the workpiece when the vacuum head is in contact therewith. A suitable seal for this purpose may be provided by an O-ring as known in the art. The vacuum head 24 is joined to an elongated member or segment 30 by a ball-and-socket arrangement shown at 32. With this ball-and-socket coupling the vacuum head 24 may pivot about the longitudinal axis of the segment 30 so as to readily engage or conform with the surface of the workpiece to be machined. As shown, the segment 30 is provided at the end thereof with a ball 34 which engages a socket 36 in the head 24 so as to provide for the pivoting or swiveling motion of the vacuum head. However, if desired, the head may carry the ball and the socket may be disposed at the end of the segment. In any event, suitable seals such as O-rings 38 and 40 are used at appropriate locations on the ball-and-socket coupling to assure a vacuum-tight seal therebetween.

The elongated segment 30 of the vacuum pad assembly is in turn disposed in passageway 22 in a rectangular housing 42 having a segment-receiving bore 44 extending therethrough and secured to the annulus 16 by any suitable means such as the bolts illustrated at 46. The segment 30 is reciprocatable in the bore 44 and passageway 22 so as to provide for selectively positioning the vacuum head so as to effectively vary the diameter of the frame which enables the frame to receive workpieces of different diameters and also provides for the ready stress relief and alignment of the workpiece such as by correcting the "roundness" of the latter during various phases of the machining operation. Each vacuum head is selectively movable in radial directions with respect to the center of the annulus 16 or axis of rotation of the frame and is securable in desired positions by employing a suitable, well known releasable latching or locking device such as a knurled bolt as shown at 48. With this arrangement the movement of the vacuum head when engaging the workpiece allows for the fixture to pull or push the workpiece into a desired configuration, which affords a particularly desirable feature in machining parts in close tolerances.

The vacuum head 24 may be coupled to a suitable vacuum source (not shown) through a manifold or header system 50 disposed in the base 12 and provided with ducts extending to each vacuum pad assembly. One such duct, as shown at 52, is coupled to a vacuum head through a conduit or tubulation 54 containing a selectively operatable control valve 56 and suitable passageways or bores in the annulus and segment, as shown at 58 and 60, respectively. In order to maintain the vacuum source in registry with the vacuum head during the pivotal movement of the latter with respect to the segment 30 a depression or relief 62 is provided in the socket 36. Similarly, a relief 64 is used to maintain the passageways 58 and 60 in the annulus and segment in communication when the segment is moved in either direction within the annulus. While the communication between the vacuum source and the vacuum head is shown extending through passageways in the annulus and a portion of a segment, it will appear clear that other constructions may be suitable. For example, the tubulation may be placed in direct contact with the end of the segment by employing a suitable yoke arrangement in the segment or by providing a labyrinthic seal between the passageway in the segment and the tubing.

In operation of the fixture of the present invention the frame 10 is affixed to the rotary chuck of a suitable machine tool and a workpiece 18 is then placed inside the frame as shown in FIG. 1, with the lower end of the workpiece abutting against an annular shelf such as shown at 66. With the workpiece positioned inside the frame the vacuum pad assemblies 20 are advanced individually by moving the segments 30 in the annulus until contact of each vacuum head 24 is established with the outer surface of the workpiece. The vacuum pad assemblies are then locked in position by the knurled nuts 48 and the swivel heads are then adjusted to closely conform to the surface of the workpiece contour without applying any stress or other deleterious distortion to the workpiece. When this alignment is completed the vacuum head assemblies are selectively connected to the vacuum source by operation of the valves 56. The workpiece to be machined is thus locked into position without applying any distortion inducing stress or strain to the workpiece. If an orbicular structure is to be machined, a centrally disposed pedestal as shown at 68 may be employed. Also, if desired, a spring-loaded alignment ring (not shown) may be positioned inside the frame to facilitate the alignment of the workpiece in the frame.

While four vacuum pad assemblies 20 are described herein for supporting the workpiece it is to be understood that any suitable number of vacuum pad assemblies may be employed. Also, while only a single layer of vacuum pad assemblies is employed it will appear clear that a tiered arrangement of vacuum pad assemblies may be utilized for supporting workpieces of relatively lengthy configurations.

It will be seen that the fixture of the present invention is capable of holding a part in a working relationship to a machine tool in such a manner so as to effect only minimal or negligible distortion to the workpiece. This construction provides for machining of easily distortable workpieces to close tolerances with respect to wall thicknesses and roundness requirements. In effect the fixture of the present invention provides for the supporting of parts of a variety of configurations in a free or unrestricted state during a machining operation.

What is claimed is:

1. A fixture for supporting a hollow workpiece defined by a surface of revolution in a working relationship to a machining tool, comprising an annular frame having an axis of rotation, a plurality of vacuum heads circumferentially spaced apart about the inner surface of the frame, displaceable means coupled to each of said vacuum heads for providing selective displacement of each of said vacuum heads in a radial direction with respect to said axis for effecting contact of said vacuum heads with the outer surface of said workpiece, and swivel means joining each of said vacuum heads to said displaceable means for providing pivotal movement of said vacuum heads to effect the contact of the latter with said outer surface of the workpiece.

2. The fixture claimed in claim 1, wherein each of said displaceable means comprises an elongated member carried by said frame, and wherein releasable means are disposed contiguous to said member for releasing said elongated segment for said selective displacement and for locking said elongated member in a selected position.

3. The fixture claimed in claim 2, wherein said swivel means comprises a ball-and-socket coupling disposed between said elongated segment and said vacuum head.

4. The fixture claimed in claim 3, wherein a conduit means is connected to each of said vacuum heads and is in registry with a vacuum source, and wherein valve means are disposed in each of said conduit means for selectively coupling the vacuum head associated therewith to the vacuum source.

5. The fixture claimed in claim 4, wherein the frame comprises a discoidal base portion and an annulus connected thereto at a location laterally spaced therefrom, said annulus has a plurality of circumferentially spaced-apart, throughgoing passageways disposed in a plane parallel to said base, each passageway houses one of said elongated members, and wherein said releasable means are disposed in said annulus for locking said elongated member to said annulus.

* * * * *

UNITED STATES PATENT OFFICE
CERTIFICATE OF CORRECTION

Patent No. 3,838,865    Dated October 1, 1974

Inventor(s) Arthur O. Roberts and Grover C. Bell

It is certified that error appears in the above-identified patent and that said Letters Patent are hereby corrected as shown below:

Change " 75 " second line, "Grober"

to read -- Grover --

Signed and sealed this 3rd day of December 1974.

(SEAL)
Attest:

McCOY M. GIBSON JR.
Attesting Officer

C. MARSHALL DANN
Commissioner of Patents